US008679399B2

(12) United States Patent
Bleicken et al.

(10) Patent No.: US 8,679,399 B2
(45) Date of Patent: Mar. 25, 2014

(54) APPARATUS FOR METAL CUTTING AND WELDING

(76) Inventors: Eric Bleicken, Portland, ME (US);
Darrel Barnette, Austin, TX (US);
David Byron, Lake Mary, FL (US)

( * ) Notice: Subject to any disclaimer, the term of this patent is extended or adjusted under 35 U.S.C. 154(b) by 0 days.

(21) Appl. No.: 13/495,058

(22) Filed: Jun. 13, 2012

(65) Prior Publication Data
US 2012/0313299 A1 Dec. 13, 2012

Related U.S. Application Data

(60) Provisional application No. 61/520,593, filed on Jun. 13, 2011.

(51) Int. Cl.
*B23K 7/00* (2006.01)
(52) U.S. Cl.
USPC .............................. 266/49; 266/48
(58) Field of Classification Search
USPC ............................... 266/48, 49, 51
See application file for complete search history.

(56) References Cited

U.S. PATENT DOCUMENTS

| 3,226,871 | A | 1/1966 | Sargeant et al. |
| 3,325,075 | A | 6/1967 | Higuchi et al. |
| 3,724,372 | A | 4/1973 | Phillips |
| 3,776,093 | A | 12/1973 | Leverance et al. |
| 3,941,029 | A | 3/1976 | Skahill |
| 4,061,261 | A | 12/1977 | Fredriksson et al. |
| 5,140,893 | A | 8/1992 | Leiter |
| 5,196,647 | A | 3/1993 | Majors |
| 5,474,226 | A | 12/1995 | Joseph |
| 5,883,328 | A | 3/1999 | A'Costa |
| 6,318,228 | B1 | 11/2001 | Thompson |
| 6,772,934 | B2 | 8/2004 | Banker |
| 6,805,832 | B2 * | 10/2004 | Mohler et al. ................. 266/48 |
| 7,677,150 | B2 | 3/2010 | Dater et al. |
| 2002/0112599 | A1 | 8/2002 | Sabates et al. |
| 2004/0069134 | A1 | 4/2004 | Sabates et al. |
| 2012/0313299 | A1 * | 12/2012 | Bleicken et al. ................. 266/48 |

OTHER PUBLICATIONS

Powder-actuated tool, Wikipedia entry at http://en'wikipedia.org/Wiki/Powder-actuated_tool website, prior to Apr. 13, 2011, 4 pp.
Explosion Welding Dissimilar Metals, High Energy Metals, Inc. website, http://highenergymetals.com, prior to Apr. 13, 2011, 3 pp.
Explosion Welding, Answers entry at http://www.answers.com/topic/explosion-welding website, prior to Apr. 13, 2011, 3 pp.
Shockwave Vortex Gun, Experimental Interaction Unit entry at http://www.eiu.org/orig/experiments/gsg/vortex.htm, prior to Apr. 13, 2011, 2 pp.
Vortex Ring Gun, Defense Update entry at http://defene-update.com/products/v/vortex-ring.htm, prior to Apr. 13, 2011, 2 pp.

* cited by examiner

*Primary Examiner* — Scott Kastler
(74) *Attorney, Agent, or Firm* — Chris A. Caseiro

(57) ABSTRACT

A device for either or both of metal cutting and metal welding. The device is configured to a standard service side arm and other guns and/or other types of tools to cut and/or weld metals for the purposes of breaching and welding metals in a range of applications, including in air and underwater, without degrading the primary purposes of the gun or other tools. In one embodiment, the device includes a reactive material cartridge and a nozzle adapted for attachment to a muzzle. In another embodiment, the device includes a muzzle-loading tube including the reactive material and a nozzle configured to shape the reactive material exiting the tube.

11 Claims, 8 Drawing Sheets

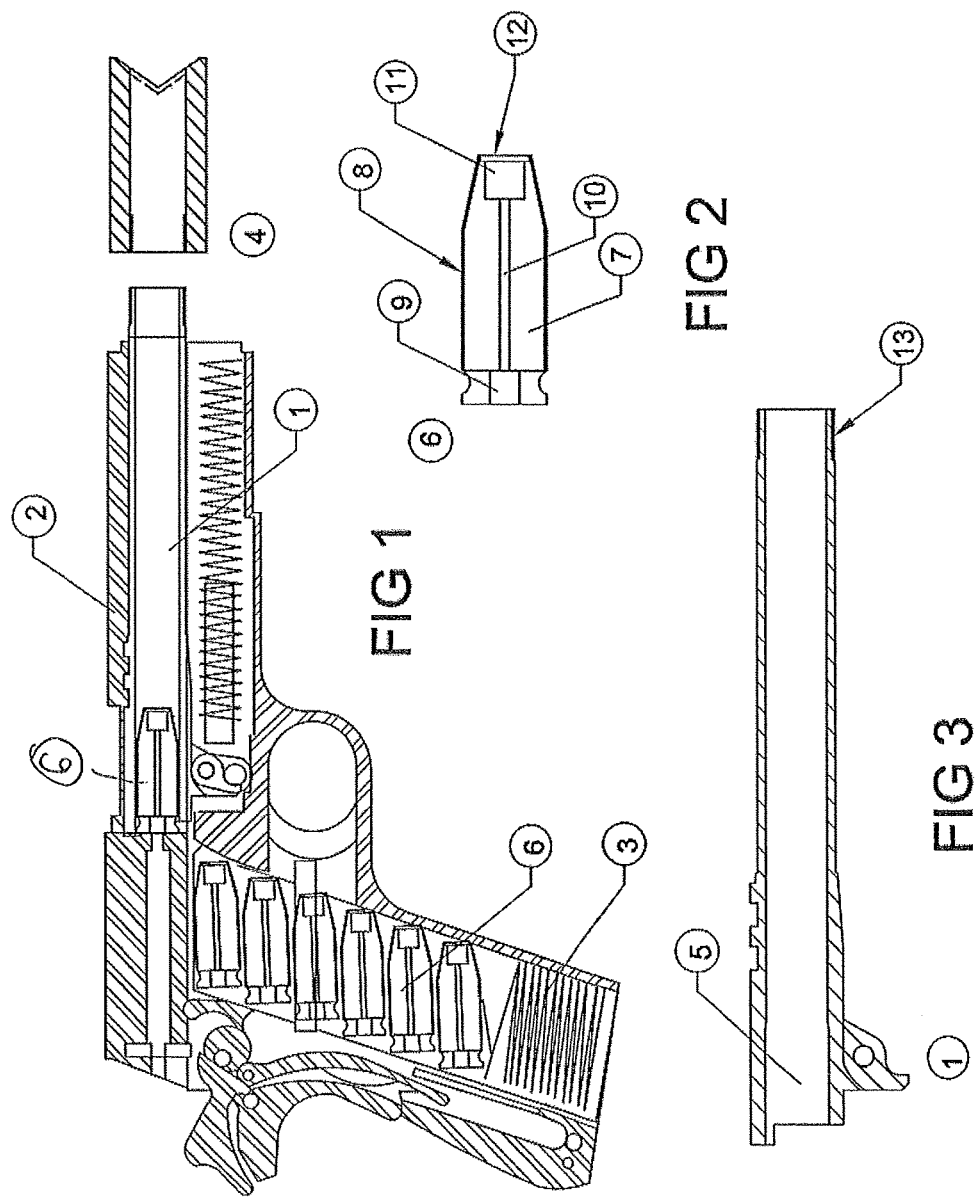

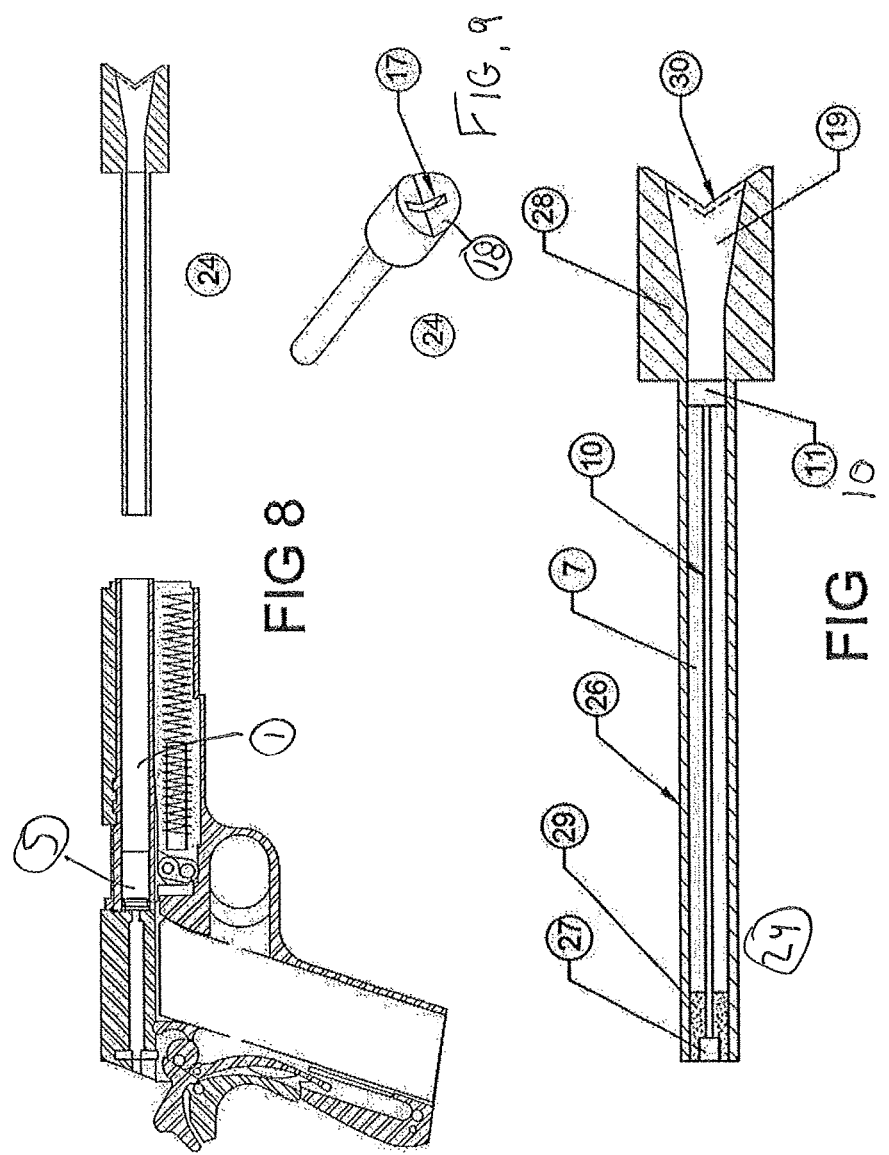

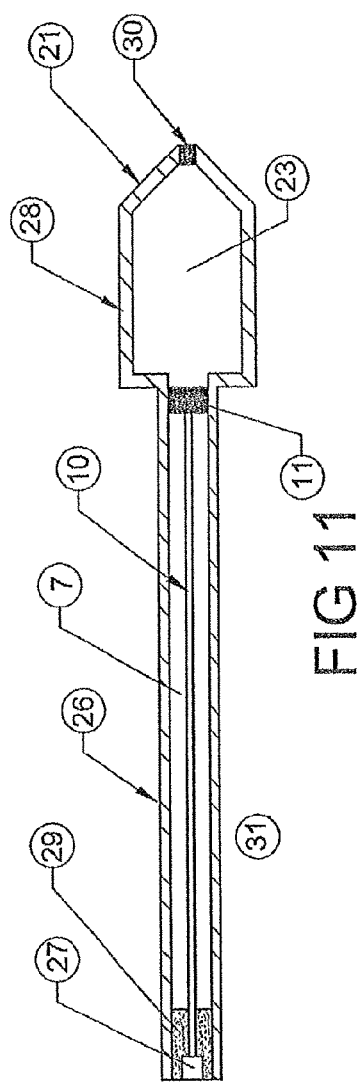
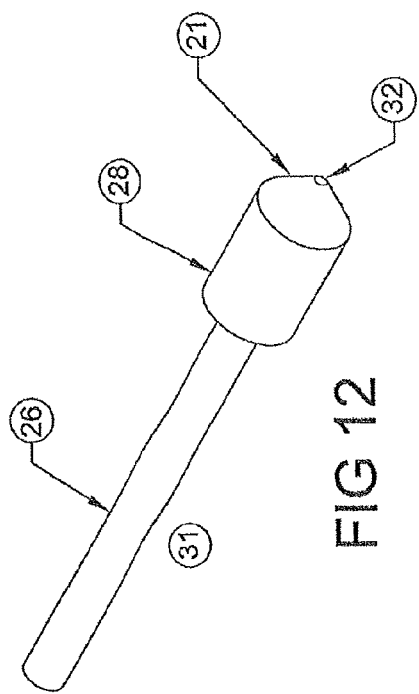
FIG. 11
FIG. 12

APPARATUS FOR METAL CUTTING AND WELDING

CROSS-REFERENCE TO RELATED APPLICATION

This application is a nonprovisional and claims the priority benefit of U.S. provisional patent application Ser. No. 61/520,593, filed Jun. 13, 2011, entitled "METAL CUTTING/TRACK WELDING KIT FOR SERVICE SIDEARM OR OTHER GUN." The entire content of the priority application is incorporated herein by reference.

BACKGROUND OF THE INVENTION (1) Field of the Invention

This invention relates to devices for cutting and welding metal. More particularly, this invention relates to devices for cutting and welding metal using reactive materials.

(2) Description of the Prior Art

Military, law enforcement, and emergency response personnel have a longstanding need for breaching locks, doors and other devices to allow access to closed areas and spaces in time sensitive situations. Similarly, these same communities and other officials who carry guns require a means to instantly tack weld things to metal objects in air or underwater such as bridge abutments, radio towers, ships hulls and other targets.

To be able to instantly perform these tasks underwater, as well as in air, is an enormous benefit, especially in covert and clandestine military operations. These breaching/tack welding devices will greatly increase the probability of mission success and operator safety while reducing the size, weight and time necessary to perform these various purposes, as compared to any system or device currently in use.

Traditionally, electric and gas welding systems have been used for these purposes but are not usually carried into combat, law enforcement, or first responder situations; and must be acquired after a critical circumstance has been neutralized. Additionally, a number of explosive and incendiary devices have been developed that will penetrate and/or weld like and unlike metal; nonetheless, these specialized systems must be planned for in advance, in order to have them available when needed. No prior art exists to convert or develop standard service guns that will accurately and reliably fire normal ammunitions as well as provide the added capabilities of cutting and tack-welding metals: the unique purpose of this invention.

Recent research and development of high power density, chemically reactive materials now make possible its packaging in a manner feasible for use in service weapons for this purpose. Some potentially related systems are explosively driven systems that are of limited value in clandestine or covert operations where minimal noise is critical and explosives create a variety of logistical and operational limitations in both foreign and domestic situations. U.S. Pat. No. 3,724,372 describes the concept of an incendiary device. It is a stand-alone device for defeating Improvised Explosive Devices (IED) and other purposes. It does not encompass the concept of modifying a standard service gun for the purposes of breaching and tack welding metals. Therefore the tactical advantages of the proposed invention are not realized. In a manner, the indicated reference describes a different means of containing and delivering Reactive Materials (RM).

What is needed is a device that enables cutting and/or welding in a clandestine manner in a variety of operating environments including, but not limited to, underwater.

BRIEF SUMMARY OF THE INVENTION

The present invention is a device that enables cutting and/or welding in a clandestine manner in a variety of operating environments including, but not limited to, underwater. The device converts a handgun or other weapon for the purposes of cutting and tack-welding metals. Multiple embodiments are described but the invention is not limited specifically to these embodiments. Some embodiments include the use of a Reactive Material (RM), which is a thermite composition including a metallic powder and an oxidizer which, when ignited, produces an exothermic oxidation-reduction reaction. Examples of RM suitable for the purpose of using the device of the present invention include, but are not limited to mixtures of aluminum and iron oxide or aluminum plus copper oxide. The RM is contained in a containment device, such as a cartridge.

Other embodiments, while useful for RM, improve the firearm itself. The first embodiment is a cartridge that is fed into the breech from the gun's magazine or clip when the muzzle is temporarily fitted with a cutting or welding nozzle. In this case, the gun's breech, barrel and detachable nozzle should be manufactured from heat resistant material such as ceramic, or at least its bore may be fabricated of such material, including the option of using a composite, and/or a ceramic-composite combination, provided such material is either or both of refractory and insulative (at least in comparison to metal).

The second embodiment is a muzzle-loaded sleeve with a fixed end nozzle that slides inside the gun barrel and is ignited by pulling the trigger and causing the hammer to strike the cap that is located in the breech. Because of the extremely high temperature associated with RM, traditional steel gun barrels cannot be exposed to the burning process; therefore, in the second embodiment the muzzle-loaded sleeve should be made from a material (such as ceramic, composite and/or ceramic-composite material, or at least its bore may be fabricated of such material, including the option of using a composite, and/or a ceramic-composite combination) that can withstand the extremely high temperatures generated by the RM. In both embodiments, the weapon may still be able to function as a normal gun before and after using it for the purpose of cutting or spot welding metal. It is also to be noted that the adaptive muzzle of the present invention may be used with some other sort of tool not limited to a gun, wherein the adaptive muzzle includes an adaptive nozzle and a tube affixed to the nozzle, wherein the tube includes the reactive material therein and includes means for igniting the reactive material for passage through the adaptive nozzle. The tool to enable the directed passage of the ignited reactive material to a desired location may be a gun barrel but is not limited thereto.

These embodiments of the device of the present invention are able to cut and spot-weld metals; however specific RM formulations and nozzle configurations for particular applications are likely to be different. It is further expected that nozzles and RM may be specifically designed for rapid burning as well as slow burning if and when quiet operation is essential. Another embodiment of the invention utilizes the thermal insulator characteristics of some ceramics to increase the brisance of RM and gunpowder to improve their efficiencies. In this embodiment, either the bore or the entire barrel is made of a ceramic material. The ceramic material is refractory and/or insulative more than conductive, unlike a conventional metal used to make a gun barrel. As a result, the heat of reaction is reflected by the ceramic of the bore/barrel back into the combustion reaction instead of being absorbed by the barrel, resulting in a more energetic reaction for the force applied to the projectile. A further embodiment of the invention utilizes a barrel with oval rifling. The oval rifling reduces the risk of stress concentrators, while improving the flight characteristics of a projectile by eliminating engraved edges which could interact with air. Yet another embodiment of the invention is a barrel with a taper to the bore. In a gun barrel with a uniform barrel internal cross section, a projectile, once deformed by bore rifling, hysteresis reduces the gas seal moving down the bore. The introduction of a taper to the bore increases the likelihood of establishing a tight projectile fit along the entire length of the barrel, thereby enhancing the energy behind the projectile as it exits the gun. Yet another embodiment of the invention allows the rifling to possess an accelerating spin. This can protect projectiles containing sensitive materials, and can allow specific shear rates for RM gasses within the bore.

BRIEF DESCRIPTION OF THE DRAWINGS

FIG. 1 is a cross sectional, side elevation of a first embodiment of the device of the present invention including a gun loaded with RM cartridges and a cutting nozzle that attaches to the muzzle.

FIG. 2 is a cross sectional, side elevation of an RM cartridge of the invention.

FIG. 3. is a cross sectional side elevation of a gun barrel that may be ceramic or at least include a ceramic bore sleeve.

FIG. 8 is a cross sectional, side view of a second embodiment of the device of the present invention including a gun with a muzzle loaded RM device positioned for inserting into the gun barrel.

FIG. 9 is a perspective view of the muzzle loaded RM device of FIG. 8.

FIG. 10 is a cross sectional, side elevation of a muzzle loaded RM device of the invention.

FIG. 11 is a cross sectional view of a muzzle loaded RM tack-welding device of the invention.

FIG. 12 is a perspective view of a muzzle loaded RM tack-welding device of the invention.

DETAILED DESCRIPTION OF PREFERRED EMBODIMENTS OF THE INVENTION

Figure 5:
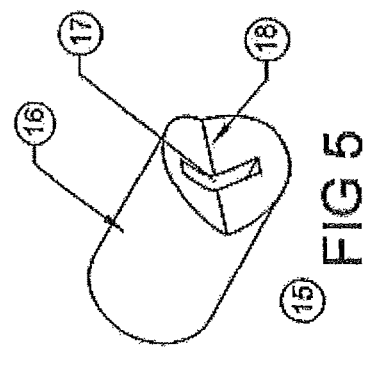
FIG. 5 is a perspective view of a detachable cutting nozzle.

A first embodiment of a cutting/welding device of the present invention is shown in FIG. 1 as a gun. The gun of the first embodiment and/or components and variants of components thereof are shown in FIGS. 1-7 and include a heat resistant barrel 1, a slide 2, a magazine 3, a removable nozzle attachment 4, a breech 5, one or more cartridges containing Reactive Material (RM) cartridge 6, RM 7, a RM cartridge casing 8, a primer 9, a hollow flame tube 10, a RM ignition initiator 11, a seal 12, an optional male nozzle mount 13, an optional female nozzle mount 14, a detachable cutting nozzle 15, a cylinder body 16, a slot opening 17, a front face 18, a portal 19 that may be slot-shaped or other configuration, and a detachable tack-welding nozzle 20.

The barrel 1 may duplicate, in general form, existing barrels used in weapons currently in service or it may be a new gun barrel design to accommodate increased dimensions to the sidewall of the barrel 1, changes in weight that might affect the semi-automatic function of the gun and/or other mechanical issues. Additionally, the interior surface of the gun barrel 1 may include polygonal rifling rather than lands and grooves, or such other form of rifling as described herein. For illustration purposes only, the gun represented in FIG. 1 is government model 1911-A1 45 cal. semi-automatic service weapon with modified or modifiable gun barrel 1 but the invention is not limited to that specific gun type or model. Other barrel forms are possible with the present invention, including those having non-round shape including, but not limited to, polygonal shapes. The same can be said for the other tube and nozzle tool components described herein.

There is a means to temporarily attach to the gun barrel 1 one or more nozzles 13 used for cutting and tack-welding. This "means" may be a dogging device, threads or some other locking mechanism. The barrel 1 is composed of heat resistant ceramic and/or composite materials that can withstand repeated, extremely high temperatures and rapid temperature fluctuations. The entirety of the barrel 1 may be made of ceramic or such other material, or at least its bore may be fabricated of such material. Semi-automatic handguns are the most likely weapon to be configured for the dual purpose of shooting projectiles as well as cutting and tack-welding. Because the breech 5 is contiguous to the barrel 1, no leakage of RM during ignition will occur: a problem that would likely happen with a revolver. Nonetheless, a semi-automatic gun that normally chambers the next round is not expected to semi-automatically feed RM cartridges 6 because there will be insufficient blow-back pressure. Each cartridge 6 may be manually fed using the gun's slide 2 to insert another round from the magazine 3.

The RM cartridge casing 8 shown in FIG. 2, is similar in size and dimensions to a fully loaded gun round to include the projectile containing RM 7 in order to maximize the amount of RM 7 contained in the cartridge 8. However, other dimensions and sizes of the RM cartridge casing 8 are contemplated and may require a change in the dimensions of the gun barrel 1. The primer 9, normal to a center fire round, detonates into the hollow flame tube 1) on impact with the gun's hammer. The flame tube 10 extends longitudinally through the center of the RM 7 to prevent ignition of the RM 7 along its path. The detonation extends to the RM initiator 11 that in turn ignites the RM 7 from the front of the cartridge casing 8. The resulting high temperature abrasive flame burns into the gun barrel 1 and out through the detachable cutting 15 or the detachable tack-welding 20 nozzle.

The cutting nozzle 15 is mechanically attached to the gun barrel with a dogging system or some other means and is used only with RM cartridges 6 designed for cutting metal. The nozzle 13/14 is composed of a robust material that can tolerate extremely high temperatures. The material may be a ceramic material, such as a composite-reinforced ceramic. The nozzle 13/14 may be fabricated completely of such material, or it may include at least a bore made of such material.

The outer shape of the cutting nozzle 15 is the cylindrical body 16 to differentiate it from the tack-welding nozzle 20 and the front face 18 of the cutting nozzle 16 is concave or V shaped. The slot opening 17 extends through the center and at 90° to the V-shaped or curved front face 18. This embodiment allows for easily centering and holding the nozzle 18 over a rod or bar stock to be breached. Any sort of focusing configuration of the portal 19 can be of benefit in modifying the velocity of the output of the RM 7.

The detachable tack-welding nozzle 20 attaches to the gun barrel 1 in the same manner as the cutting nozzle 15 with male/female interface 13/14, a dogging system or some other means. Rather than being cylindrical like the cutting nozzle 15, the front of the nozzle 20 includes a focusing pointed end 21 to differentiate it. An internal chamber 23 of the nozzle 20 is designed to form a vortex and there is a round orifice 22 rather than a slot to concentrate burning reactive material for the purpose of tack-welding.

It is contemplated that selectable configurations of the RM cartridges 6 may be created and employed as a function of whether a fast or a slow (quiet) burn is preferred. Each cartridge form may require a certain form of the barrel 1 and/or either or both of the cutting nozzle 15 and the tack welding nozzle 20. They may further be configured with a unique shape to aid with identification when operational visibility is limited. Standard magazines 3 may also be modified so that a nozzle can be fixed to it when RM rounds are not in use in order to have the correct nozzle available when needed. In addition, a specific rotation of the RM gasses may assist in the kinetics of the RM function for vortex control.

A second embodiment of a cutting/welding device of the present invention is shown in FIG. 8 as a gun. The gun and/or components and variants of components thereof are shown in FIGS. 8-12 and include the gun barrel 1, the breech 5, a muzzle loading cutting component 24, a heat resistant tube 26, an impact-initiated primer 27, a cutting nozzle 28, an inert breech plug 29, a nozzle plug 30, which may be frangible or ablative, a muzzle loading tack welding device 31, the RM 7, the hollow flame tube 10, the RM ignition initiator 11, the slot opening 17 for the cutting component 24, and the pointed end 21 and the internal chamber 23 for the muzzle loading tack welding device 31.

The heat resistant tube 26 is configured to extend substantially the entire length of the gun barrel 1 and extending through the breech 5, is fitted with a center fire primer 27 or impact initiated electronic device at the point where the gun's hammer can ignite the device corresponding in that manner to the operation of the gun of FIG. 1. The internal flame tube 10 or other energy propagating mechanism that runs the length of the RM 7 contained in the tube 26 provides a flame source to the RM initiator 11 causing the RM 7 to ignite at the muzzle end of the device. Extending beyond the barrel 1 is a nozzle 28 that is affixed to the heat resistant tube 26 and is also made from heat resistant material.

This second embodiment does not offer the convenience of rapidly firing a series of incendiary rounds or the convenience of being stored and available in a standard gun magazine as is provided by the embodiment of FIGS. 1-7. Nonetheless, it does provide far greater cutting and tack-welding energy given the greater volume of RM 7. It may be used in a standard steel gun barrel or with a ceramic barrel or a barrel including a ceramic bore, such as an interior ceramic sleeve, or other material that is more refractory and/or insulative than metal and capable of operation under the temperatures to be expected when using RM. The nozzle 28 is provided that is specifically configured for a particular purpose and the RM contained therein is also formulated for that purpose. As a result, the device 24 may be a one-time use device.

This muzzle-loaded embodiment may be held in place at the muzzle of the barrel 1 by friction, magnet or some other means. It may also be used with a ceramic gun barrel, or barrel with a ceramic bore, that can utilize the magazine fed RM cartridges 6. The section of the tube 26 that extends into the breech 5 may require additional thickness or may optionally be the inert plug 29 to prevent splaying of the device 24 in the breech 5 during ignition that might prevent easy extraction following its use.

As seen in FIG. 10, the tube 26 is elongate with the nozzle 28 affixed thereto. The end of the device 24 that extends into the breech is provided with the primer 27 that is exploded into the flame tube 10 that extends longitudinally through the center of the device 24 and prevents the ignition of the surrounding RM 7. At the muzzle end of the device 24, and behind the cutting nozzle 28 is the RM Initiator 11 that activates the RM 7. As described in the first embodiment above, the nozzle 28 has a cylindrical outer shape with the V shaped or concave front face 18 with the slot 17 situated 90° through the center of the face 18. The slot 17 may be plugged with plug 30, which may be a frangible or ablative material to protect the interior of the device 24 from environmental hazards during storage.

Like the previously described embodiment, the cutting nozzle 28 may have a slotted or some other configuration designed to increase the cutting efficiency of the torch established upon ignition of the RM 7.

Figure 7:
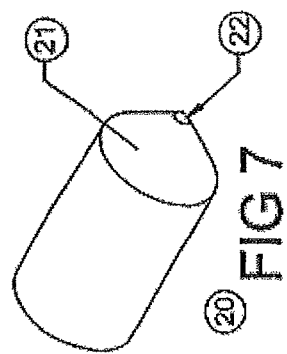
FIG. 7 is a perspective view of a detachable tack-welding nozzle.
Figure 4:
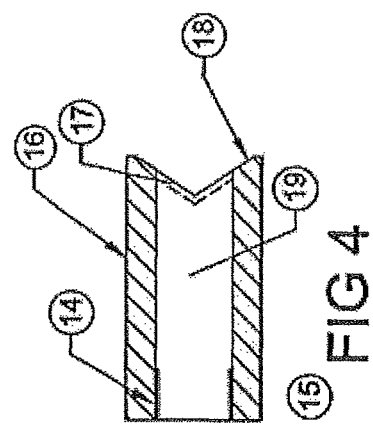
FIG. 4 is a cross sectional, side elevation of a detachable cutting nozzle.
Figure 6:
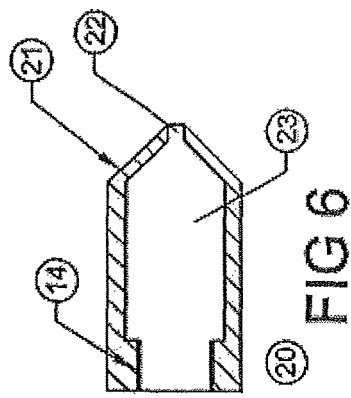
FIG. 6 is a cross sectional, side elevation of a tack-welding nozzle.

The muzzle loaded tack-welding device 31 shown in FIGS. 11 and 12 is substantially the same in configuration as the tack welding nozzle of FIGS. 6 and 7 except that it is affixed to the tube 26 and insertable in a single unit into the muzzle of the barrel 1. The nozzle 31 includes a round orifice 32 and the internal chamber 32 that causes the expanding RM plasma to form a vortex in order to maximize the welding properties of the device 24. However, the RM formula may be substantially different than that used for cutting metals.

Figure 13:
FIG. 13 is a cross sectional view of the bore of the barrel of the present invention showing in exaggerated view the oval rifling option.

An additional enhancement of the present invention to increase the effectiveness of the tool and/or the functioning of the RM 7 includes a reduction of stress concentrations in the bore while still providing rifling that imparts spin to the projectile existing the barrel. An example of such stress concentration rifling is an oval rifling configuration in the bore, as represented in FIG. 13. The oval rifling circumscribes the interior of the barrel. Most conventional rifling that exists in the interior of gun barrels includes alternating lands and grooves wherein the lands and grooves have sharp vertices that score the projectile substantially. The rifling imparts spin to the round as it passes through the barrel. That spin enables better maintenance of the line of travel of the projectile beyond the muzzle. It also stresses the bore of the barrel as sharp vertices are stress concentrators.

The interior of the barrel of the present invention may optionally be configured to minimize stress concentration sites in the bore. In particular, the interior of the barrel is configured with rotating (i.e., circumscribing) oval-shaped rifling, which imparts the force to the projectile that causes it to rotate as it departs the muzzle. That is, the barrel includes a helical bore comprising an oval cross section wherein the lands represent the minima of the oval and the grooves represent the maxima of the oval. When the barrel and/or nozzle of the tool of the present invention is fabricated of a non-metallic material such as a ceramic or a composite-reinforced ceramic, including such a tool with a bore that is fabricated of such material, with a portion or the remainder of the tool fabricated of another material, the elimination of sharp vertices, such as through the use of oval-shaped rifling, minimizes the existence of stress concentrations of the barrel by dispersing stresses evenly around the barrel hoop, thereby reducing the likelihood of causing some form of damage to the barrel upon projectile activation. Further, the oval-shaped rifling limits cutting into the projectile jacket that occurs with conventional rectangular lands and grooves, which cutting may cause drag and uneven spin of the projectile, thereby reducing its accuracy and distance. The oval rifling need only be of sufficient dimension to impart spin to the projectile, which is also enough to enable detection of tool marks for identification purposes, The extent, shape and periodicity of the oval rifling may be selectable as a function of the desired speed and rotation rate for the projectile expelled from the barrel/nozzle, but not so significant as to cause substantial scoring of the projectile jacket.

The present invention also includes the option of providing a barrel including a bore with tailored rifling, whether the barrel is made of ceramic material, composite material or a combination of the two, either for its entirety or a portion thereof including the bore. For example and without intent to be limiting, the bore near the breech may have no rifling, while rifling may be formed between the breech and the muzzle. That rifling may be constant or it may be varied. For example, the rifling may part an initial relatively slow spin to the projectile and then increase the rate of spin as the projectile reaches the muzzle.

The present invention also includes the option of providing in a barrel including at least a ceramic, composite or ceramic-composite bore, one or more electrically conductive components that may be used to create a spark gap. The spark gap may be employed to activate something associated with the projectile. For example, the spark gap may be located near the breech such that when the projectile is actuated, a spark is generated that activates the projectile. This may be useful to regulate activation of a projectile such as one including the RM material, whether provided as a cased or a caseless projectile.

The terminus of the barrel may also be configured with reduced dimensions, and/or the barrel may be tapered for a portion or all of its length, at least at the interior diameter to create a squeeze bore. That configuration minimizes hysteresis of the barrel during projectile passage and may be of particular usefulness when the barrel is fabricated with ceramic or composite-reinforced ceramic, or at least with a bore fabricated of such material. A tapered or reduced inside dimension barrel restricts gas leakage around the perimeter of the projectile as it passes through the barrel. The resultant effect is greater pressure behind the projectile as it exits the barrel so that it may travel farther with the same original energy than is possible with a barrel configured to permit gas to pass around the projectile prior to its exit.

Another tool 100 for retaining and firing RM cartridges 6 is shown in FIGS. 14-17. The tool 100 includes a barrel 102, a trigger 104, a replaceable clip 106 containing the RM cartridges 6 and a spring-loaded striking pin 108. The tool 100 is configured to allow the user to access and fire a plurality of RM cartridges 6. This tool is used solely for the purposes of cutting and tack welding in air and underwater. Because the tool is not a gun and no bullets will be fired from it, there is no requirement for rifling or constricting the barrel. Nevertheless, either or both of these features may optionally be incorporated into the tool to enhance or otherwise change the performance of the RM. The required cutting or tack-welding nozzles may be permanently fixed or detachable, depending on its intended use. A bore material which is either or both of refractory in nature and which has a low thermal conductivity may be used to increase the efficiency of the chemical reactions.

The present invention has been described with attention paid primarily to firearms and handheld-type tools that are not specifically firearms, all with the characteristic of enabling the delivery of RM from such a device to a target, whether for cutting, welding or other purposes. It is noted that the features of the barrel, nozzle, tube or the like described herein as one or more aspects of a handheld device may also be applicable in the delivery of a projectile and in the delivery of the energy of RM from equipment, a tool, or the like that is more stationary in nature. For example, and without intending to be limiting, the features of the delivery system described herein may be embodied in a machine, mounted, or unmounted, for manual control, as well as computer-controlled devices such as CNC machines. At least the bores of such devices and equipment can incorporate the features of including nonmetallic material (ceramics, composites and/or a combination of the two, for example), oval rifling, variability of rifling, tapering and electronic activation options all described herein, to enhance the effectiveness, accuracy and energy associated with a projectile delivered or activated, such as RM. Such devices would be operable more as manufacturing machines with better functionality rather than a firearm with better functionality. It is also to be noted that while the present invention has been described with respect to the removable attachment of the adaptive nozzle to a muzzle of a firearm, it is to be understood that the muzzle may also be that of another type of tool including, for example, the muzzle of a piece of manufacturing equipment. Therefore, the term "muzzle", as well as the term "barrel" are to be construed broadly and not limited to the muzzle or barrel of a firearm.

The cutting/welding device of the present invention provides for effective cutting and/or welding under a range of conditions (in air or underwater) with a tool that is portable and more manageable under a wide range of operating environments than is available with existing cutting/welding tools and systems. These advantages are provided in the example embodiments of the invention described and shown, as well as with other embodiments incorporating the features described herein. The invention is not limited to the specific arrangements and example described herein. It is to be understood that the invention includes all reasonable equivalents.

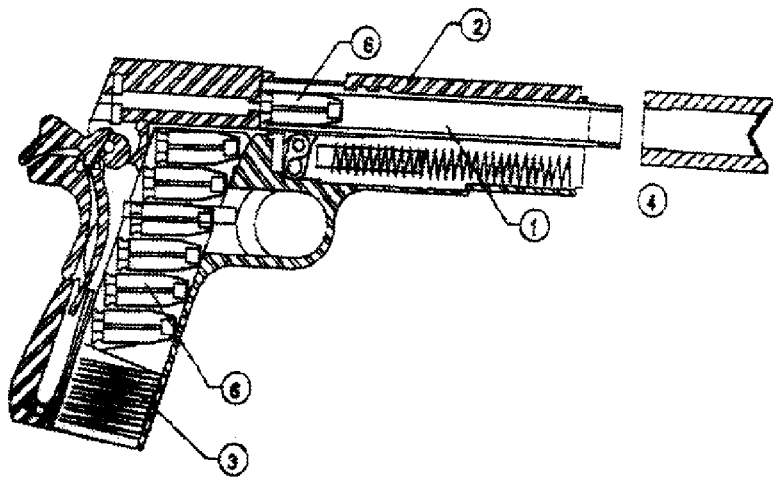

What is claimed is:

1. A device for cutting or welding metal, the device comprising:
   a. a gun modified to include a heat resistant barrel having a bore;
   b. an adaptive nozzle removably attached to the heat resistant barrel of the gun, wherein the adaptive nozzle includes an internal chamber defined by a bore fabricated of a non-metallic material selected to be either or both of sufficiently refractive and insulative to reflect back into the internal chamber of the nozzle a heat of reaction generated by the ignition of a reactive material, wherein the reactive material is a thermite composition including a metallic powder and an oxidizer; and
   c. a cartridge containing the reactive material, wherein the cartridge is configured to fit in a magazine and includes means for igniting the reactive material for passage through the bore of the heat resistant barrel and the bore of the adaptive nozzle.

2. The device of claim 1, wherein the non-metallic material of the adaptive nozzle bore is a ceramic and wherein the bore of the heat resistant gun barrel is a ceramic bore.

3. The device of claim 1, wherein the adaptive nozzle includes an opening configured for shaping the reactive material exiting the nozzle for the purpose of cutting metal.

4. The device of claim 1, wherein the adaptive nozzle includes an orifice configured to create a vortexed shape of the reactive material exiting the nozzle for the purpose of welding metal.

5. The device of claim 1, wherein the nozzle includes an internal slot geometry.

6. The device of claim 1, wherein the cartridge includes a hollow flame tube extending thereto.

7. The device of claim 1, wherein the means for igniting includes an impact initiated primer.

8. The device of claim 2, wherein the ceramic bore of the gun barrel includes rifling without sharp vertices.

9. The device of claim 8, wherein the rifling is oval-shaped.

10. The device of claim 8, wherein the rifling is variable.

11. The device of claim 1, wherein the barrel includes a tapered bore.

\* \* \* \* \*

UNITED STATES PATENT AND TRADEMARK OFFICE
CERTIFICATE OF CORRECTION

| | | |
|---|---|---|
| PATENT NO. | : 8,679,399 B2 | Page 1 of 6 |
| APPLICATION NO. | : 13/495058 | |
| DATED | : March 25, 2014 | |
| INVENTOR(S) | : Eric Bleicken et al. | |

It is certified that error appears in the above-identified patent and that said Letters Patent is hereby corrected as shown below:

The title page showing the illustrative figure should be deleted and replaced with the attached title page.

In the drawings:

Sheet 1, Fig 1, should be replaced with the following:

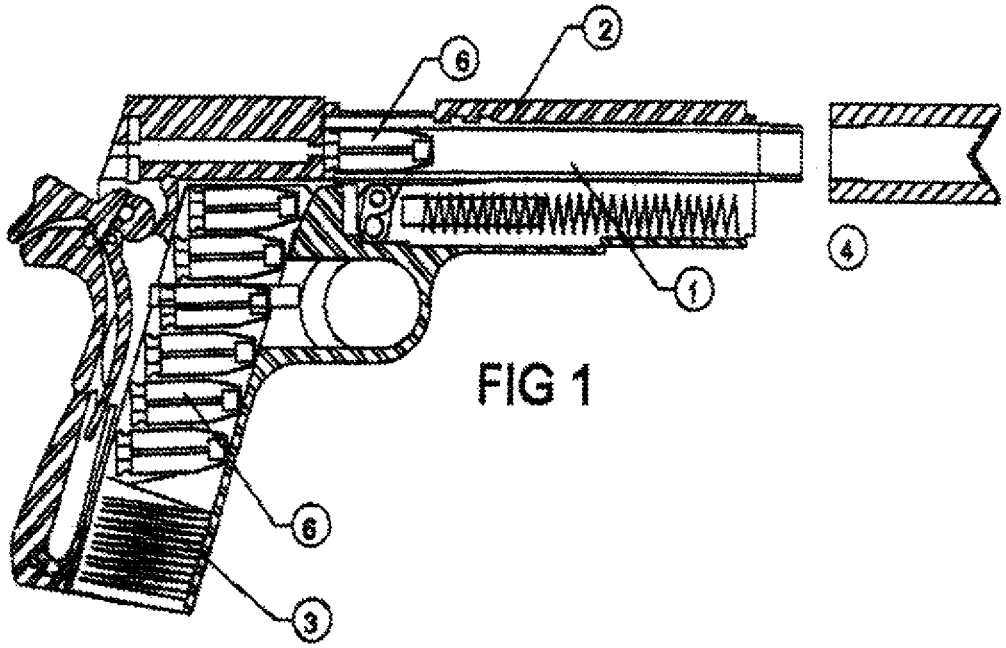

Signed and Sealed this
Eighth Day of July, 2014

Michelle K. Lee
*Deputy Director of the United States Patent and Trademark Office*

CERTIFICATE OF CORRECTION (continued)

U.S. Pat. No. 8,679,399 B2

Sheet 3, Fig 8, should be replaced with the following:

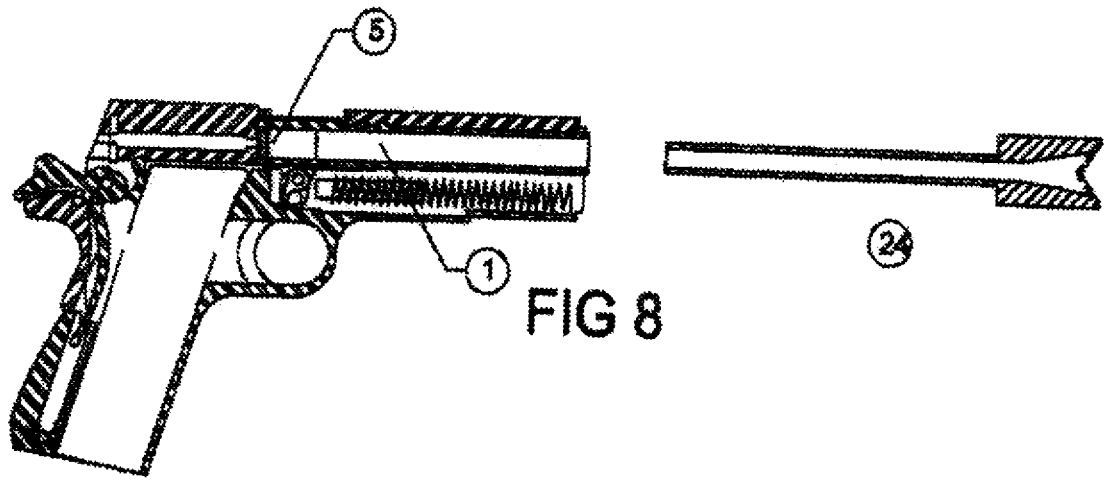

Sheet 3, Fig 9, should be replaced with the following:

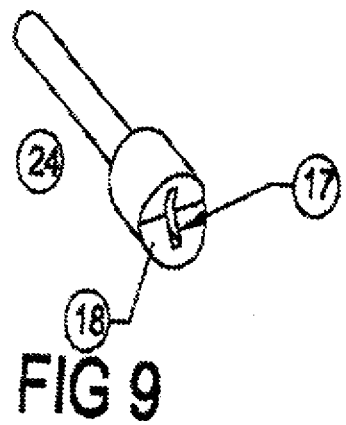

Sheet 3, Fig 10, should be replaced with the following:

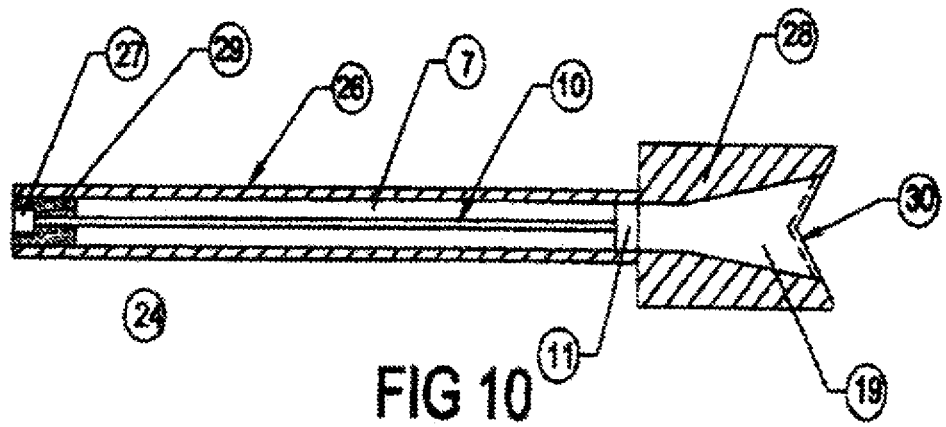

Figure 14:
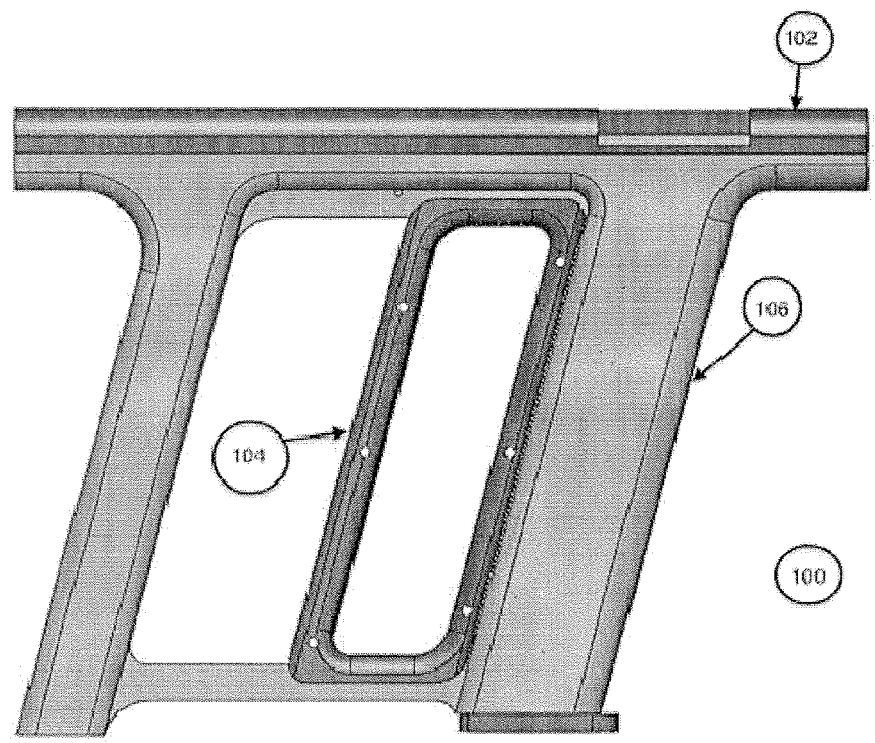
FIG. 14 is a side view of a clip portion of a tool for containing the RM and also showing a portion of a barrel of the tool.
Figure 15:
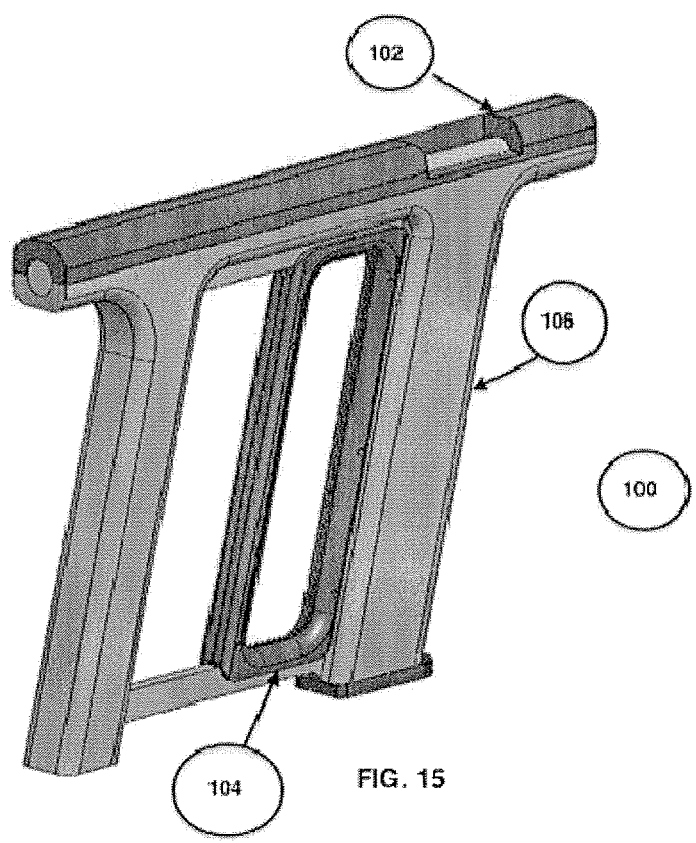
FIG. 15 is a perspective view of the portion of the tool as shown in FIG. 14.
Figure 16:
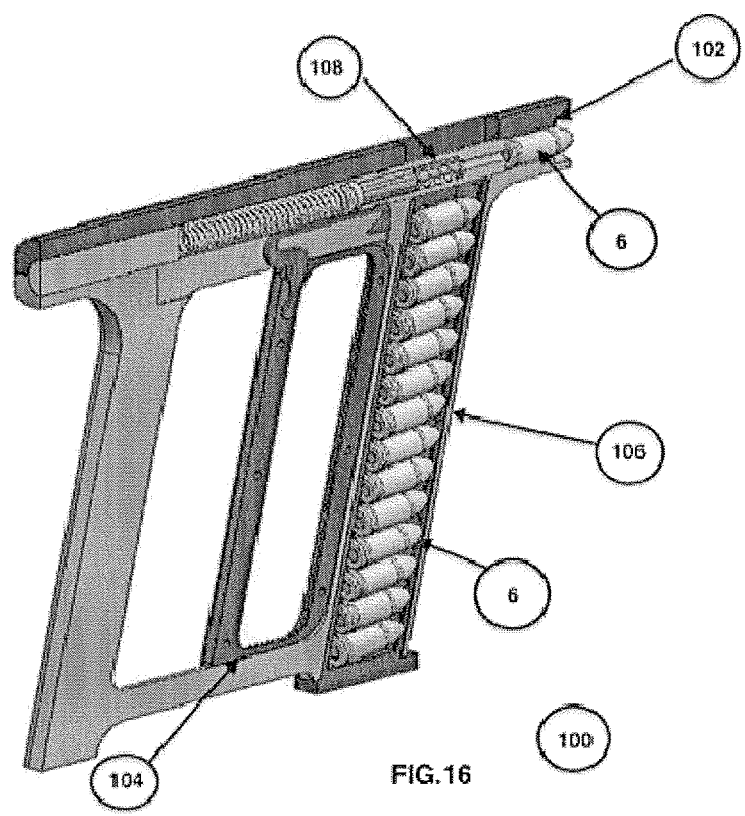
FIG. 16 is a partial cut away perspective view of the tool of FIG. 14 showing the RM cartridges in the clip.
Figure 17:
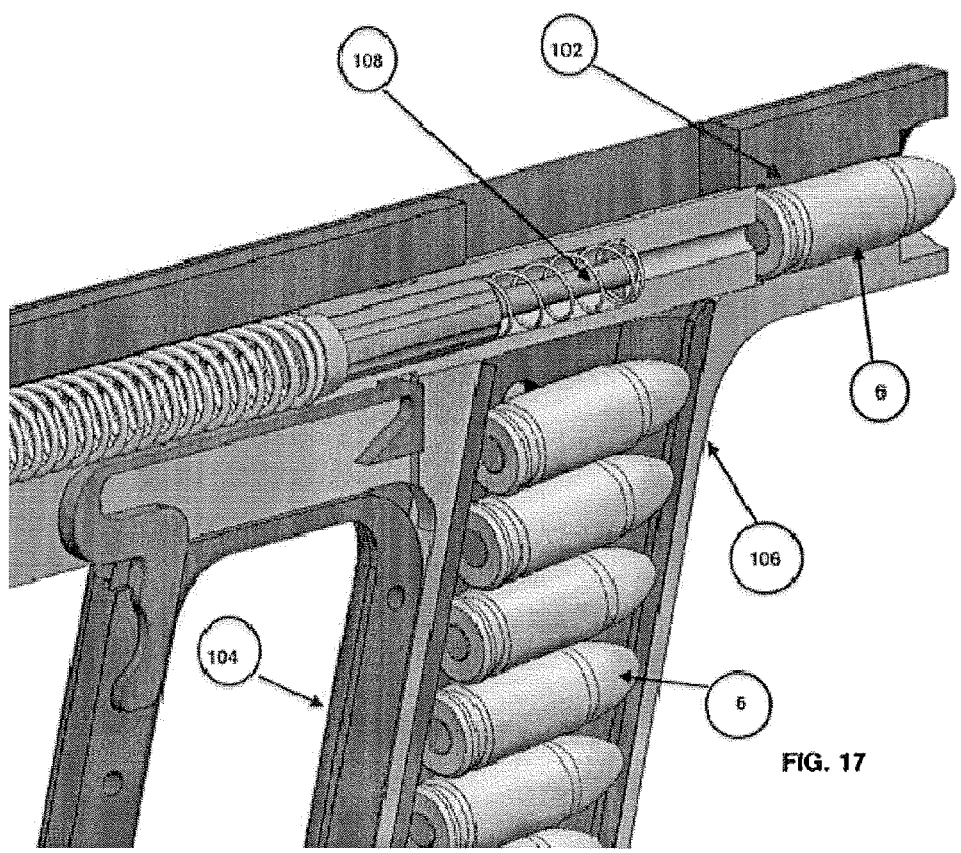
FIG. 17 is a close-up partial cut away perspective view of the tool of FIG. 14 showing the RM cartridges in the clip.
Figure 13:
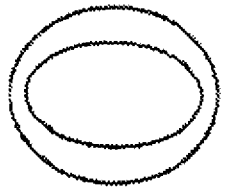
Figure 14:
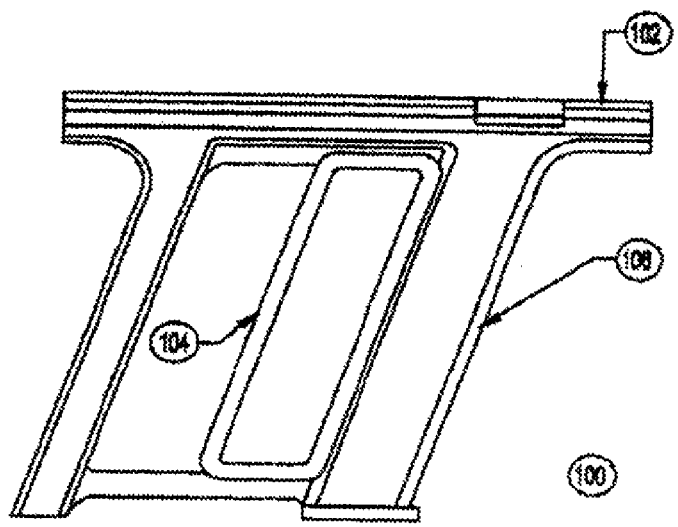
Figure 15:
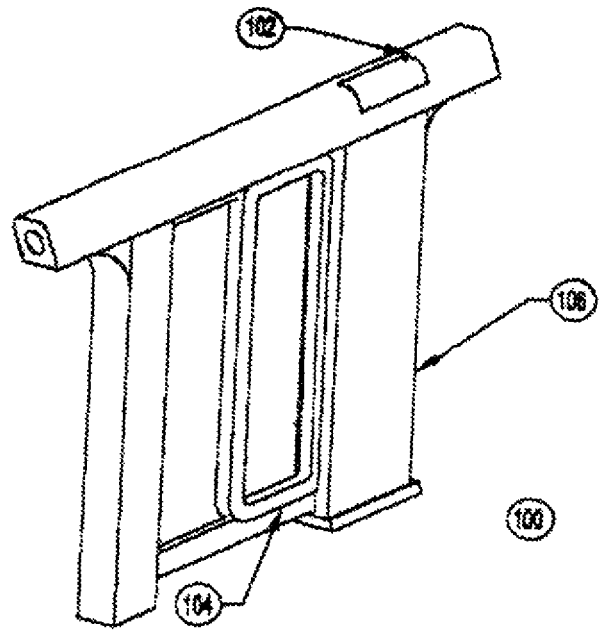
Figure 16:
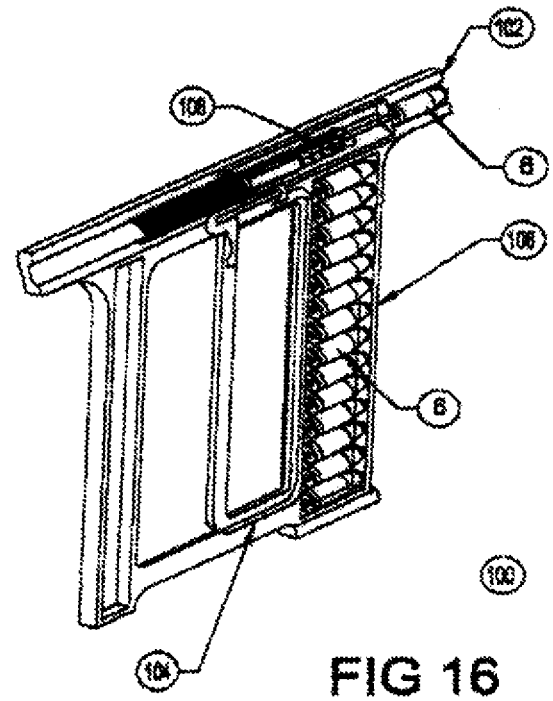
Figure 17:
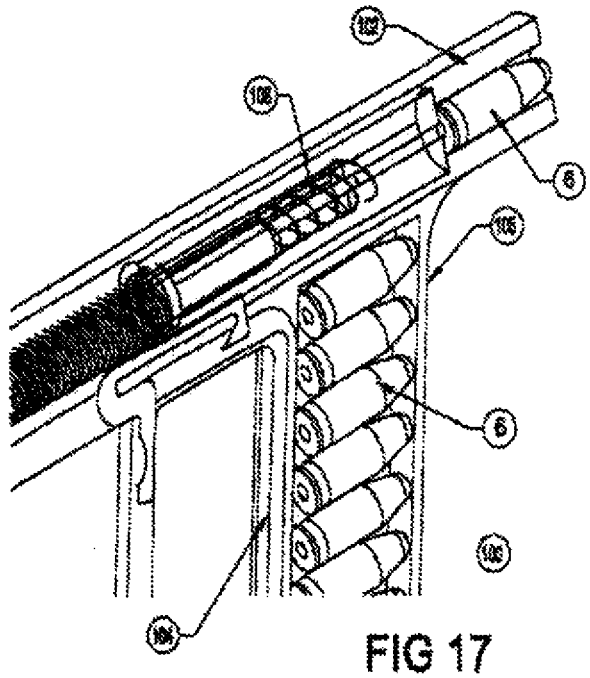

Sheet 5, Fig 13, should be replaced with the following:

Sheet 5, Fig 14, should be replaced with the following:

Sheet 6, Fig 15, should be replaced with the following:

Sheet 7, Fig 16, should be replaced with the following:

Sheet 8, Fig 17, should be replaced with the following:

(12) United States Patent
Bleicken et al.

(10) Patent No.: US 8,679,399 B2
(45) Date of Patent: Mar. 25, 2014

(54) APPARATUS FOR METAL CUTTING AND WELDING

(76) Inventors: Eric Bleicken, Portland, ME (US); Darrel Barnette, Austin, TX (US); David Byron, Lake Mary, FL (US)

( * ) Notice: Subject to any disclaimer, the term of this patent is extended or adjusted under 35 U.S.C. 154(b) by 0 days.

(21) Appl. No.: 13/495,058

(22) Filed: Jun. 13, 2012

(65) Prior Publication Data
US 2012/0313299 A1 Dec. 13, 2012

Related U.S. Application Data

(60) Provisional application No. 61/520,593, filed on Jun. 13, 2011.

(51) Int. Cl.
*B23K 7/00* (2006.01)

(52) U.S. Cl.
USPC .................................. 266/49; 266/48

(58) Field of Classification Search
USPC .......................................... 266/48, 49, 51
See application file for complete search history.

(56) References Cited

U.S. PATENT DOCUMENTS

| | | | |
|---|---|---|---|
| 3,226,871 | A | 1/1966 | Sargeant et al. |
| 3,325,075 | A | 6/1967 | Higuchi et al. |
| 3,724,372 | A | 4/1973 | Phillips |
| 3,776,093 | A | 12/1973 | Leverance et al. |
| 3,941,029 | A | 3/1976 | Skahill |
| 4,061,261 | A | 12/1977 | Fredriksson et al. |
| 5,140,893 | A | 8/1992 | Leiter |
| 5,196,647 | A | 3/1993 | Majors |
| 5,474,226 | A | 12/1995 | Joseph |
| 5,883,328 | A | 3/1999 | A'Costa |
| 6,318,228 | B1 | 11/2001 | Thompson |
| 6,772,934 | B2 | 8/2004 | Banker |
| 6,805,832 | B2 * | 10/2004 | Mohler et al. ............. 266/48 |
| 7,677,150 | B2 | 3/2010 | Dater et al. |
| 2002/0112599 | A1 | 8/2002 | Sabates et al. |
| 2004/0069134 | A1 | 4/2004 | Sabates et al. |
| 2012/0313299 | A1 * | 12/2012 | Bleicken et al. ............. 266/48 |

OTHER PUBLICATIONS

Powder-actuated tool, Wikipedia entry at http://en'wikipedia.org/Wiki/Powder-actuated_tool website, prior to Apr. 13, 2011, 4 pp.
Explosion Welding Dissimilar Metals, High Energy Metals, Inc. website, http://highenergymetals.com, prior to Apr. 13, 2011, 3 pp.
Explosion Welding, Answers entry at http://www.answers.com/topic/explosion-welding website, prior to Apr. 13, 2011, 3 pp.
Shockwave Vortex Gun, Experimental Interaction Unit entry at http://www.eiu.org/orig/experiments/gsg/vortex.htm, prior to Apr. 13, 2011, 2 pp.
Vortex Ring Gun, Defense Update entry at http://defene-update.com/products/v/vortex-ring.htm, prior to Apr. 13, 2011, 2 pp.

* cited by examiner

*Primary Examiner* — Scott Kastler
(74) *Attorney, Agent, or Firm* — Chris A. Caseiro

(57) ABSTRACT

A device for either or both of metal cutting and metal welding. The device is configured to a standard service side arm and other guns and/or other types of tools to cut and/or weld metals for the purposes of breaching and welding metals in a range of applications, including in air and underwater, without degrading the primary purposes of the gun or other tools. In one embodiment, the device includes a reactive material cartridge and a nozzle adapted for attachment to a muzzle. In another embodiment, the device includes a muzzle-loading tube including the reactive material and a nozzle configured to shape the reactive material exiting the tube.

11 Claims, 8 Drawing Sheets